(12) United States Patent
Kahn et al.

(10) Patent No.: US 8,897,704 B1
(45) Date of Patent: *Nov. 25, 2014

(54) METHOD AND APPARATUS TO ENABLE USE OF MOTION TO ASSOCIATE DEVICES

(75) Inventors: Philippe Richard Kahn, Santa Cruz, CA (US); Arthur Kinsolving, Santa Cruz, CA (US); David Vogel, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/047,753

(22) Filed: Mar. 14, 2011

Related U.S. Application Data (63) Continuation of application No. 11/855,133, filed on Sep. 13, 2007, now Pat. No. 7,907,901.

(51) Int. Cl.
*H04B 7/00* (2006.01)
*H04B 5/00* (2006.01)

(52) U.S. Cl.
USPC .......................... 455/41.2; 455/41.1; 455/502

(58) Field of Classification Search
CPC H04M 2250/12; H04M 1/7253; H04W 12/00
USPC .............. 455/41.2, 41.3, 41.1, 425, 502, 13.2
See application file for complete search history.

(56) References Cited

U.S. PATENT DOCUMENTS

| 7,427,926 | B2 * | 9/2008 | Sinclair et al. ................. 340/4.2 |
| 8,391,786 | B2 * | 3/2013 | Hodges et al. ............... 455/41.2 |
| 2007/0213045 | A1 | 9/2007 | Hermansson et al. | |

OTHER PUBLICATIONS

Mayrhofer, R., Gellersen, H., "Shake Well Before Use: Authentication Based on Accelerometer Data", In: Proc. Pervasive 2007, Springer-Verlag, May 2007, pp. 144-161.
Mayrhofer, R., Gellersen, H., "Shake Well Before Use: two implementations for implicit context authentication", Adjunct Proc. Ubicomp 2007, Sep. 2007, pp. 72-75.
Simonite, Tom, "Synchronised shaking connects gadgets securely", NewScientist.com news service, http://www.newscientist.com/article/dn12912, Nov. 13, 2007, 2 pages.

* cited by examiner

*Primary Examiner* — Eugene Yun
(74) *Attorney, Agent, or Firm* — HIPLegal LLP; Judith A. Szepesi (57) ABSTRACT

A method and apparatus to provide easier pairing based on motion data is described. The method of associating two devices comprises receiving a signal to enter into pairing mode, and detecting a motion indicating a pairing. The method further comprises establishing a secure connection with another device for pairing, the secure connection established based on the motion, and exchanging data.

20 Claims, 7 Drawing Sheets

METHOD AND APPARATUS TO ENABLE USE OF MOTION TO ASSOCIATE DEVICES

RELATED APPLICATIONS

The present application is a continuation of U.S. application Ser. No. 11/855,133, filed on Sep. 13, 2007, which is now U.S. Pat. No. 7,907,901 issuing on Mar. 15, 2011.

FIELD OF THE INVENTION

The present invention relates to associating devices, and more particularly to associating at least two mobile devices with each other.

BACKGROUND

Pairing describes associating devices with each other. For example, a multi-device remote control may need to be paired with the associated television, or a Bluetooth headset may be paired with the mobile phone that the user would like to use with it.

Generally, in the prior art pairing the devices was a long and involved process. For example, a typical pairing of a Bluetooth headset with a phone may include the following steps:

The headset:
 Put the headset into "Discoverable" mode (usually by holding a button or sequence of buttons) so that the phone can find it.
 Refer to your headset's user manual to find out the PIN code.

The phone:
 From the home screen, press and hold the Home key.
 Select the "Communications Manager" (second option)
 Press the "Settings" menu and choose "Bluetooth Settings"
 Choose Menu>Devices
 Choose Menu>New
 After a few seconds, the name of your headset will be displayed along with any other Bluetooth devices in range. Highlight the name of the headset that you wish to pair and press the 'Next' key.
 Enter the PIN code (found in the headset manual) to bond the two devices together.
 Press "Next" to pass by the renaming of the headset.
 On the services screen, ensure that the "Wireless Stereo" service is ticked then press "Done"
 Press "Done" on the next screen, then "Done" on the Next, then "Done" on the next.
 Press Exit to leave the Communication Manager As can be seen, this process is rather involved and requires a lot of steps, including looking up codes in a handbook and working through multiple menus.

SUMMARY OF THE INVENTION

A method and apparatus to provide easier pairing based on motion data is described. The method of pairing two devices comprises receiving a signal to enter into pairing mode, and detecting a motion indicating a pairing. The method further comprises establishing a secure connection with another device for pairing, the secure connection established based on the motion, and exchanging data for pairing.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described is for enabling the association of two or more devices. Associating devices, or pairing them, establishes a connection between the devices, and shares data between them. The term "pairing" and "associating" are used interchangeably. The process, in one embodiment, includes putting both devices in pairing mode, then performing a motion such as shaking the devices holding them in the same hand. The movement pattern, in one embodiment, is used both to identify which devices one intends to pair and then generate the key that will create the secure connection. In an alternate embodiment, a certain motion automatically launches the pairing process. The process then looks for nearby devices and attempts to pair with them, only completing the pairing if the exact motion pattern of that device's motion and the date/time stamp of the motion also match. In one embodiment, this happens in the background transparently to the user. By holding the two devices together, they become effectively one body, and the accelerations measured by the accelerometer in each device are of the same magnitude. In contrast, if the devices were simply held separately, and similar motions were made, there would be a differential not only because humans cannot reproduce the identical motions, but also because of mass differentials between the devices. Although the term "pairing" is used, it should be understood that this association need not create a permanent relationship between the devices. Rather, it is used to exchange data between the devices.

Figure 1:
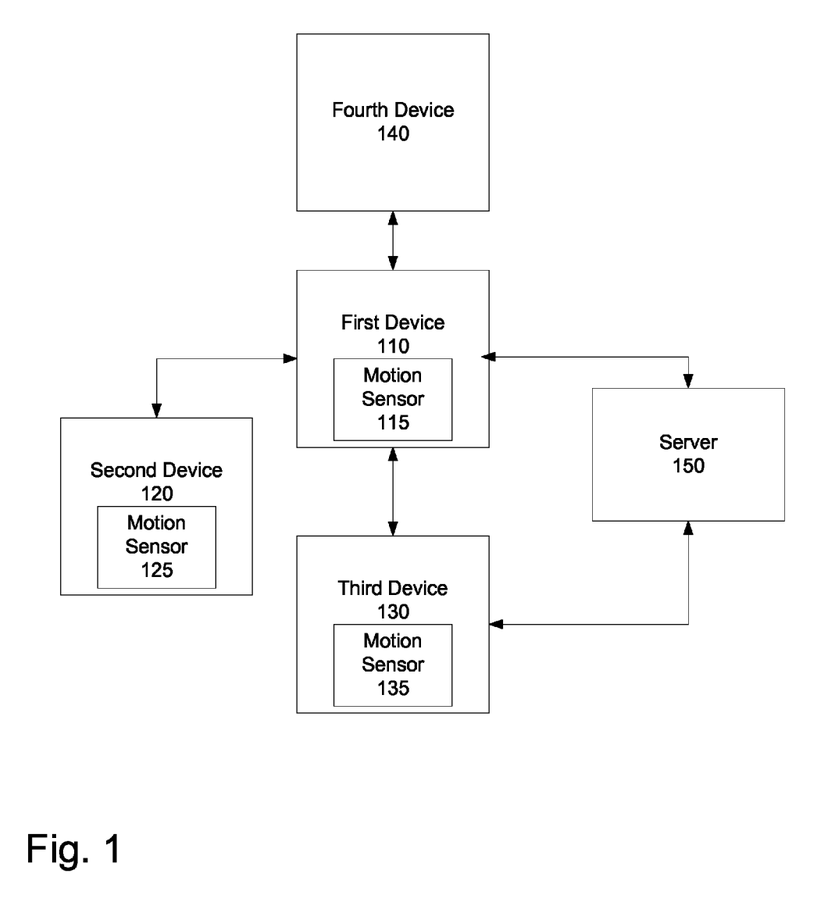
FIG. 1 is a network diagram of the devices.

FIG. 1 is a network diagram of the devices. A first device 110 is designed to be paired with a second device 120. Both devices, in one embodiment, include a motion sensor 115, 125. The user then performs a preset motion with both devices in one hand. This ensures that both devices receive exactly the same motion data. This motion data is used to pair the two devices. This process is described in more detail below.

An alternative pairing may be between the first device 110 and the third device 130. The third device 130, in one embodiment, also includes a motion sensor 135. However, in this example, the third device 130 does not have the processing capability necessary to provide motion analysis, provide device identification, and/or provide an encryption key for a secure connection. Therefore, the third device 130 relies on a server 150 to provide at least some processing and/or memory for the connection. In one embodiment, both the first device 110 and third device 130 are coupled to the server 150. In another embodiment, only one of the devices is coupled to the server 150, and the other device need not be aware of the server connection. When a server is involved in the process, any portion of the processing may take place on the server.

An alternative pairing may be between the first device 110 and a fourth device 140, which does not have a motion sensor. The fourth device 140 may be a conventional device which does not include an accelerometer or similar motion sensor. For example, the fourth device 140 may be a conventional Bluetooth headset, while the first device 110 is a mobile phone including an accelerometer. The pairing of these devices may be accomplished using the accelerometer to reduce the complexity and navigation requirements, as will be described below.

Figure 2:
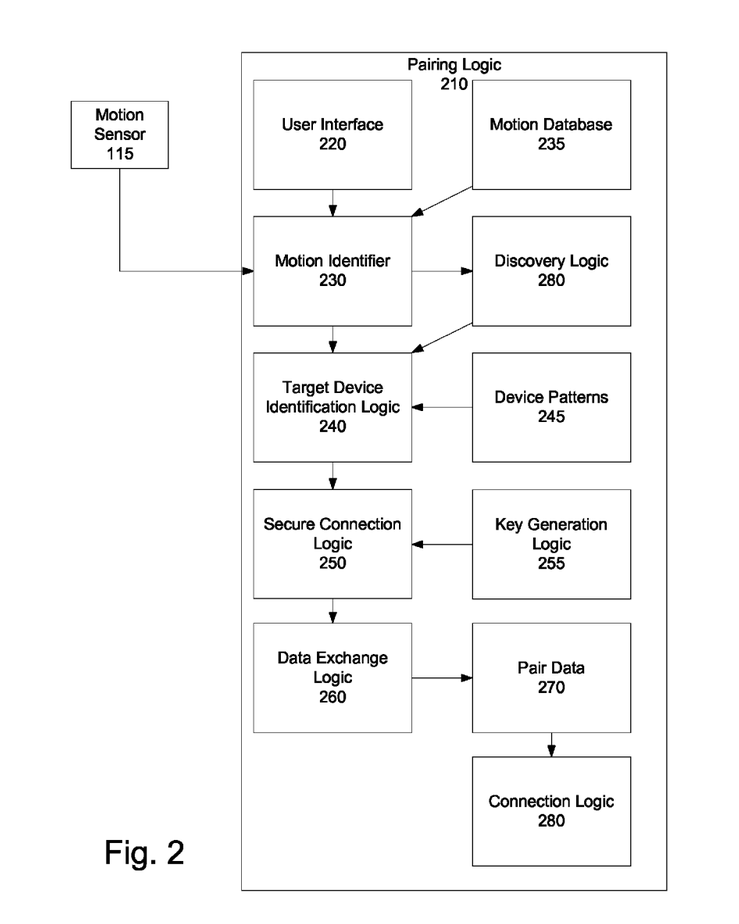
FIG. 2 is a block diagram of one embodiment of the pairing mechanism.

FIG. 2 is a block diagram of one embodiment of the pairing logic. In one embodiment, the pairing logic resides on one of the mobile devices. In one embodiment, only one of the devices has the pairing logic. In one embodiment, the pairing logic 210 may be split between the handheld device and a remote device, such as a server. In another embodiment, both devices have a pairing logic. In one embodiment, one or both of the devices may include a subset of the pairing logic elements described.

The motion sensor 115 provides data to motion identifier 230. Motion identifier 230 identifies the motion. In one embodiment, the motion identifier uses a database of motions 235 to identify the meaning of each motion. In one embodiment, the motions may initiate pairing. In one embodiment, the user may initiate pairing through user interface 220. User interface 220 may also be used to define the motions used for pairing. In another embodiment, the motions, stored in motion database 235, are pre-defined.

In one embodiment, when the motion for pairing is identified by motion identifier 230, or initiated by user interface 220, the subsequent motions are passed to target device identification logic 240. In one embodiment, the motion identifier 230 identifies the motion components, and passes these identified motion components to target device identification logic 240. For example, a motion component may be a "rapid horizontal shake" or a "clockwise circle," etc. The target device identification logic 240 uses these motion components, and data from the device patterns library 245, to identify which devices should be paired.

Secure connection logic 250 then establishes a secure connection between the device and the identified target device. In one embodiment, the motions (i.e. accelerations) are used to generate a key, by key generation logic 255. This key is used to establish the secure connection. Since the two devices are moved together, they have performed the identical motions, and thus captured substantially identical motion data. Therefore, the motion data can be used to ensure that the correct devices are paired. In one embodiment, relative motion data is used, instead of absolute motion data. This ensures that even if there are calibration differences between the accelerometers in the two devices, the same key is generated.

In one embodiment, the accelerometer data is smoothed, filtered, and/or normalized prior to performing the key generation. This ensures that the two devices' data match if they experienced the same motions. In one embodiment, a clock differential between the two devices is identified, so that an "absolute" clock time may be used for comparison purposes. For example, the system may calculate that one of the devices is 3 seconds ahead of the other device, and is 0.02 seconds faster (per second skew). This may be used to ensure that when motions are compared, the calculated "absolute" time when they occur is identical on both devices.

Data exchange logic 260 exchanges data between the devices. This data is obtained from Pair data 270, and any relevant data to be used for future connections is stored. In one embodiment, the future connection data is also stored in pair data 270.

In subsequent uses of the device, in one embodiment, connection logic 280 utilizes the stored data from pair data 270, to establish a connection with the other device. In one embodiment, this occurs automatically when the device is subsequently turned on.

Figure 3:
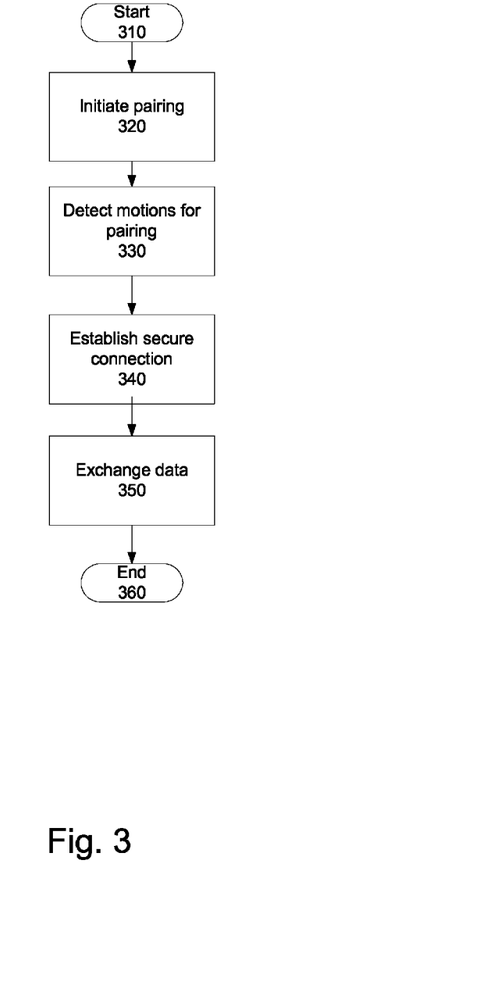
FIG. 3 is an overview flowchart of one embodiment of pairing.

FIG. 3 is an overview flowchart of one embodiment of pairing. The pairing is initiated, at block 320. As noted above, the pairing may be initialized by a user action.

At block 330, the pairing motions are detected. In one embodiment, if the pairing is initiated by motion, blocks 320 and 330 may refer to the same motions.

At block 340, a secure connection is established. The secure connection is established based on the motions detected. In one embodiment, the secure connection is an encrypted connection.

At block 350, data is exchanged between the devices for pairing. Once devices are paired, their connection can be automatically established in the future.

The process ends at block 360.

Figure 4:
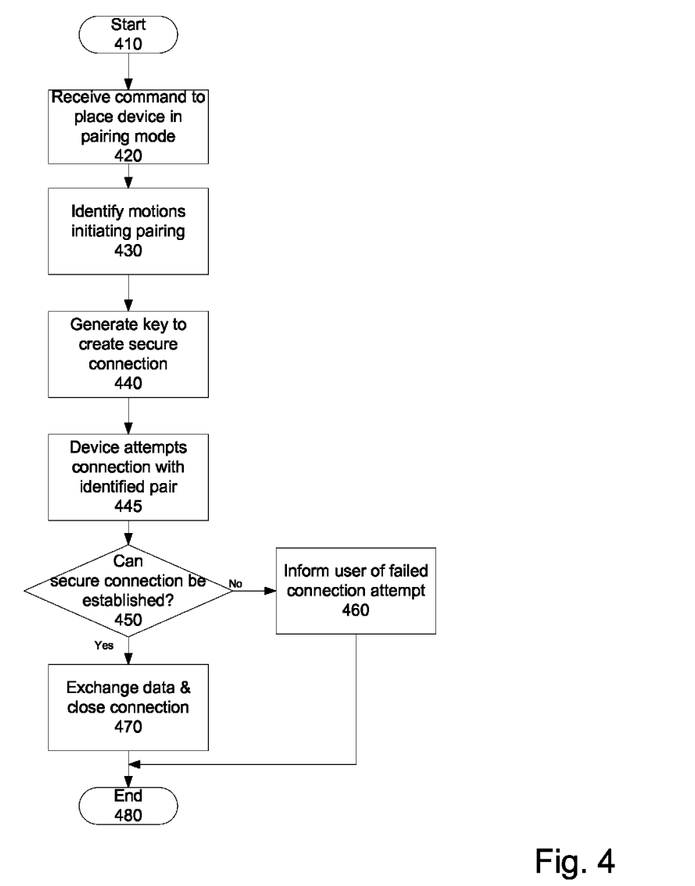
FIG. 4 is a flowchart of one embodiment of pairing.

FIG. 4 is a flowchart of one embodiment of pairing. The process starts at block 410. At block 420, a command to place the device into pairing mode is received. In one embodiment, this command may be initiated through a menu selection, through a motion, or through other means. In one embodiment, when the device is placed in pairing mode, the system indicates to the user to take both devices, hold them together, and perform a pairing motion. In one embodiment, the device may provide a list of potential pairing motions, based on the identity of the devices to be paired.

At block 430, the motions initiating pairing are received. In one embodiment, the motions identify the device to be paired. For example, a triple shake of the device may indicate pairing with a Bluetooth headset. For another example, a double shake up and down may indicate pairing with a particular sensor. In one embodiment, motion data is filtered on all three axes using a low-pass filter. In one embodiment, the low pass filter is configured to have a frequency cutoff at 4 Hz. The filter removes transient noise and allows the detection of hand movement that exhibits a change of direction greater than 250 ms. In one embodiment, each of the axes will be scaled to have a normalized motion of 1-G acceleration equivalent to 1000 integer counts. During the initial steady state, in one embodiment the dominant vector affected by Earth's gravitational field will be used to determine the accelerometer orientation on both devices. In one embodiment, this process is performed for both devices.

At block 440, a key is generated to create a secure connection. In one embodiment, the key is generated based on the exact motions performed by the user, to initiate pairing. In one embodiment, the key is based on differential motion (i.e. the relationship between various measurements, rather than exact measurements). This ensures that even if the two devices have not been cross-calibrated, the proper key is generated. In one embodiment, the measurement of the accelerometer orientation is used to perform an axis translation on both devices. Along with the axis normalization and axis translation, the directional acceleration and amplitude measurements will be equivalent on both devices. In one embodiment, using direction, acceleration amplitude and time, a coded numeric sequence will be computed and used as the key for both devices.

At block 445, the device attempts to connect with the identified device to be paired. In one embodiment, both devices attempt to establish a connection. In another embodiment, one device is the "host" device which has the software to establish such a connection, while the other device is the "client" device which is more passive, and receives the connection attempt.

At block 450, the process determines whether a secure connection can be established. If not, at block 460, the user is informed of the failed connection attempt. In one embodiment, the connection attempts are retried for a number of tries, or a preset amount of time, before this occurs. The process then ends, at block 480.

If a secure connection can be established, at block 470, data for pairing is exchanged. The secure connection is then closed, in one embodiment. In another embodiment, a pairing channel is opened, based on the pairing data, so that the devices are immediately paired for use. The process then ends, at block 480.

Figure 5:
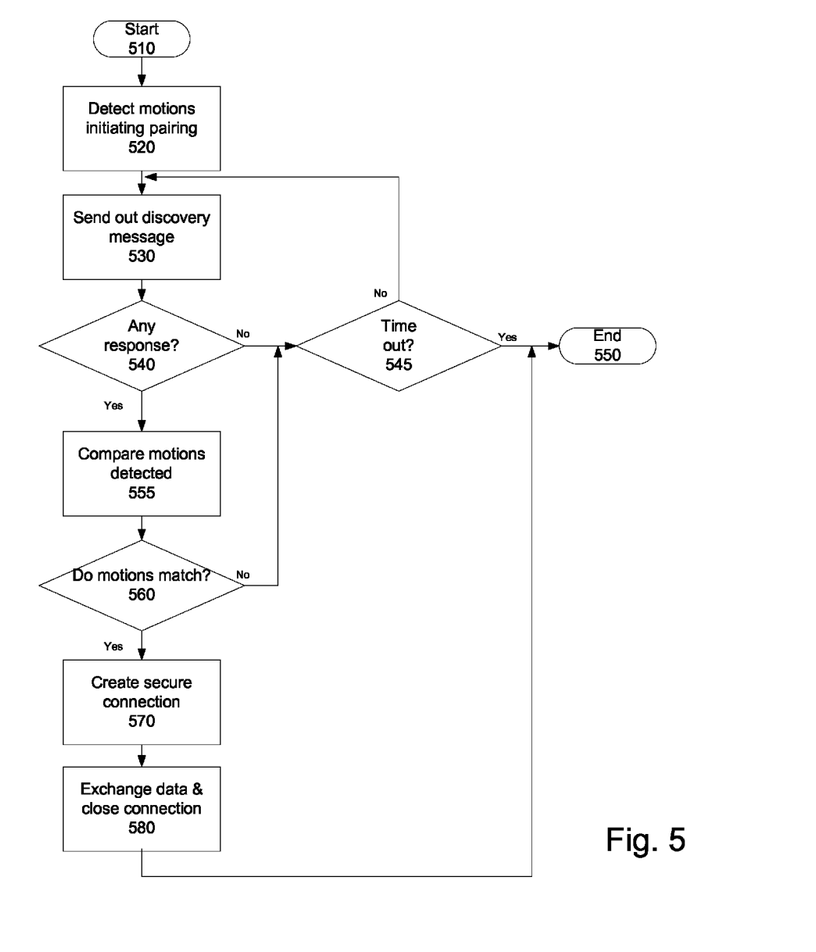
FIG. 5 is a flowchart of one embodiment of associating the two devices.

FIG. 5 is a flowchart of one embodiment of associating the two devices. The process starts at block 510.

At block 520, pairing motions are detected. In one embodiment, the user may initiate pairing mode prior to performing pairing motions. In another embodiment, the pairing motions may automatically initiate pairing mode.

At block 530, a discovery message is sent out. The discovery message, in one embodiment, is sent out in the format indicated by the pairing motions. For example, for a Bluetooth device, the discovery protocol may be to send out a "wake-up" message paired with a "trigger connection message." Each protocol and/or device may have a different discovery message.

At block 540, the process determines whether there was any response. If not, the process continues to block 545. At block 545, the process determines whether the pairing has timed out. If not, the process returns to block 530, to send out a new discovery message. In one embodiment, the pairing process is maintained for a preset period of time, or a preset number of discovery messages. For example, the system may attempt pairing for 1 minute, with discovery messages being re-sent every 10 seconds. If the system times out, the process ends at block 550.

If a response is received, at block 540, the process continues to block 555.

At block 555, the process compares the detected motions to establish whether the devices were moved together for pairing. In one embodiment, comparing the detected motions is a three step process.

First, in one embodiment, the systems perform a clock differential correction. In one embodiment, the clock differential correction involves using the time stamps on handshake messages, to determine clock differential between the devices. The clock differential may include a per/minute differential as well as a base differential. For example, clock A may be 3 seconds ahead, while clock B loses 0.1 second per minute. Once the clock differential is determined, the system has an absolute time available to use for the comparison.

Second, the system in one embodiment accounts for different relative positions between the objects being paired. Since the user can hold the devices together in any configuration, the detected motions would be along different axes depending on relative positions. This also compensates for different accelerometer locations and orientations within the devices. In one embodiment, a first motion pattern is used to orient the relative accelerometers. In one embodiment, for each motion pattern, the first motion is a spike or other noticeable motion pattern.

Third, the system compares motions or accelerations at absolute times. In one embodiment, the motion data is filtered and smoothed, prior to comparison.

At block 560, the process determines whether the motions match. If they do not match, the process returns to block 545, to determine whether the process should time out or resend the discovery message.

If the motions match, at block 570 the secure connection is created, and data is exchanged for the pairing, at block 580.

Figure 6:
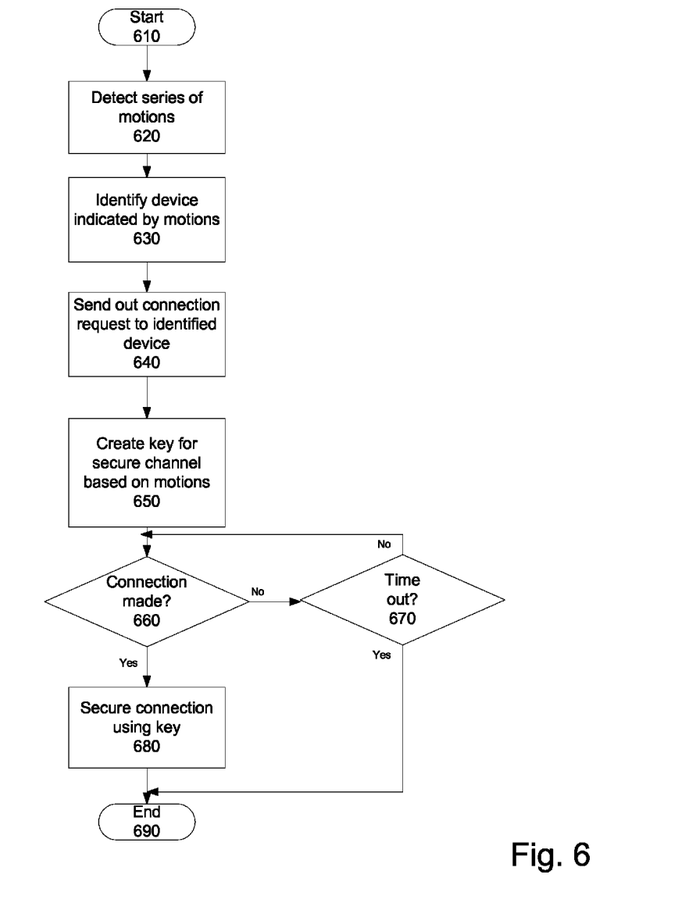
FIG. 6 is a flowchart of an alternative embodiment of associating the two devices.

FIG. 6 is a flowchart of an alternative embodiment of associating the two devices. The process starts at block 610.

At block 620, a series of motions is detected. At block 630, the series of motions is identified as a series of motions to initiate pairing, with device identification. At block 630, the system further identifies the device indicated by the motions. In one embodiment, the particular device type is identified, i.e. Bluetooth headset. In another embodiment, the protocol used by the device is identified, i.e. Bluetooth device. In another embodiment, the device manufacturer and type is identified, i.e. Jabra Bluetooth headset. In yet another embodiment, the precise device is identified, i.e. the Jabra Freespeak headset.

At block 640, a connection request is sent out to the identified device. In one embodiment, the request is as targeted as possible.

At block 650, a secure channel is created. In one embodiment, the secure channel is created by creating a unique key based on the motions performed by the user. The motion data may be converted into a series of numbers, i.e. each motion segment represented by a number. In one embodiment, a look-up table may be used for this conversion. In one embodiment, the series of numbers may be used to generate the key, through a one way hash function. Alternative methods of generating the key may be used.

At block 660, the process determines whether a successful connection was made. If not, the process determines if the attempt has timed out. If not, the process continues to try for a connection. Otherwise, the process ends at block 690.

If a connection is made, it is secured using the key, at block 680. The data exchange as described above occurs at that point. The process then ends.

Figure 7:
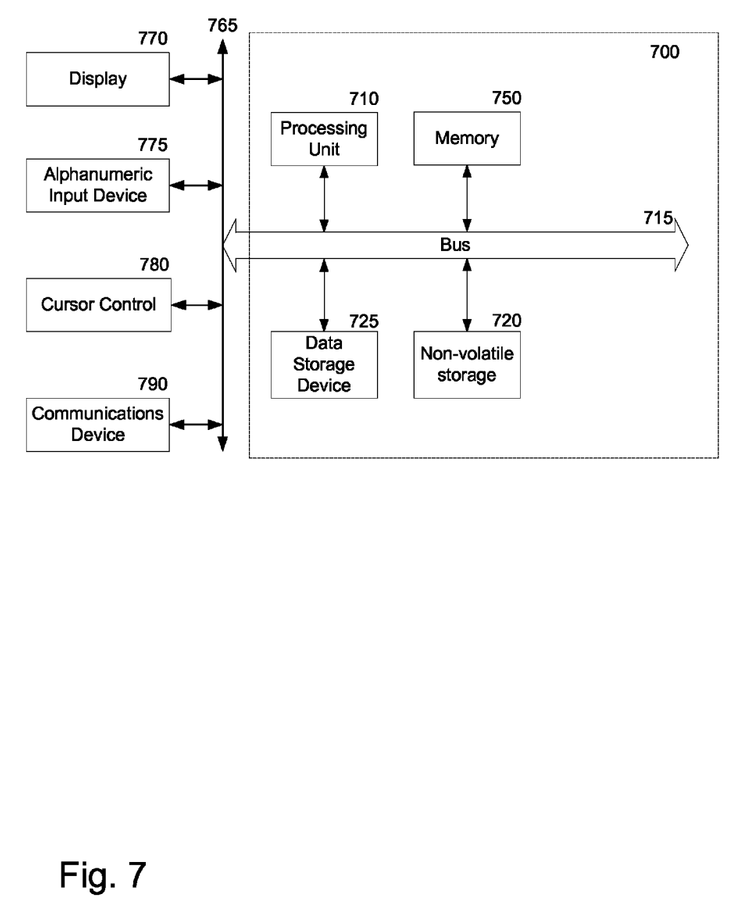
FIG. 7 is a block diagram of one embodiment of a computer system which may be used with the present invention.

FIG. 7 is one embodiment of a computer system that may be used with the present invention. It will be apparent to those of ordinary skill in the art, however that other alternative systems of various system architectures may also be used.

The data processing system illustrated in FIG. 7 includes a bus or other internal communication means 715 for communicating information, and a processor 710 coupled to the bus 715 for processing information. The system further comprises a random access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a cathode ray tube (CRT) or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments of the present invention.

It will be appreciated by those of ordinary skill in the art that any configuration of the system may be used for various purposes according to the particular implementation. The control logic or software implementing the present invention can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The present invention may also be embodied in a handheld or portable device containing a subset of the computer hardware components described above. For example, the handheld device may be configured to contain only the bus 715, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 710. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of associating two devices to exchange data, comprising with one device:
   receiving a signal to enter into pairing mode;
   generating a key based on acceleration data, the acceleration data used to calculate a differential motion pattern performed by the device, the differential motion pattern enabling holding of the device at any angle;
   establishing a secure connection with an other device, the secure connection established based on the key generated in part based on the motion pattern, the secure connection established when the device and the other device devices generate the same key based on the same motion pattern; and
   exchanging data with the other device.

2. The method of claim 1, wherein receiving a signal to enter into pairing mode comprises receiving indication through a user interface that a pairing is about to be initiated.

3. The method of claim 1, wherein the signal indicating a pairing comprises a signal identifying a target device for pairing.

4. The method of claim 1, wherein the motion indicating a pairing comprises any motion performed simultaneously with the two devices.

5. The method of claim 1, wherein the motion indicating a pairing comprises a unique motion signature to initiate the pairing mode, wherein the motion signature further comprises the signal received to initiate the pairing mode.

6. The method of claim 1, wherein the key is generated in response to receiving the signal to enter into the pairing mode by two or more devices, the key generated based on the motion data, the key used for the secure connection.

7. The method of claim 1, further comprising:
   providing the motion data to a server, the server to generate the key based on the motion data, for a device with limited processing capability.

8. A method of associating two devices to enable an exchange of data, comprising:
   instructing a user to hold the two devices together and perform a motion with the two devices together;
   calculating a differential motion data based on the motion, the differential motion data enabling comparison of motions between two devices held at different angles; and
   associating the devices based on the differential motion data, to enable the devices to exchange data through a secure connection, the connection secured based on identical keys generated by each of the two devices based on the differential motion data, generated when the two devices were moved together.

9. The method of claim 8, further comprising:
using a motion signature derived from the motion to identify the devices to be paired.

10. The method of claim 8, further comprising:
establishing a secure connection for the pairing, the secure connection established based on the motion.

11. The method of claim 8, further comprising:
identifying a target device based on the motion;
performing a handshake with the device;
synchronizing clocks of the two devices based on the handshake data; and
using the motion data and associated clock data to pair the two devices.

12. A mobile device comprising:
a motion sensor to detect movement;
a pairing logic to enable data exchange with another device, the pairing logic comprising:
  a motion identifier to use data from the motion sensor to generate differential motion pattern, the differential motion pattern used for pairing with another device;
  a key generation logic to generate a key based on the differential motion pattern performed by the mobile device;
  a secure connection logic to establish a secure connection with the other device, the secure connection established when the key matches a key generated in the other device, indicating that the devices performed an identical differential motion pattern; and
data exchange logic to exchange data with the other device over the secure connection.

13. The mobile device of claim 12, wherein the pairing logic further comprises a user interface element to receive a signal to enter into pairing mode.

14. The mobile device of claim 12, wherein the motion identifier is further to identify a motion pattern indicating pairing.

15. The mobile device of claim 12, wherein the pairing logic further comprises a discovery logic to send or receive a signal to enter the mobile device into pairing mode.

16. The mobile device of claim 15, wherein the signal to enter into pairing mode comprises a discovery signal identifying a target device for pairing.

17. The mobile device of claim 12, wherein the pairing logic further comprises a motion identifier to receive a motion indicating a pairing, the motion being any motion performed simultaneously with a plurality of devices.

18. The mobile device of claim 12, wherein the pairing logic further comprises a motion identifier to identify a unique motion signature to initiate the pairing mode, wherein the unique motion signature is used by the target device identification logic to initiate the pairing mode.

19. The mobile device of claim 12, wherein the data exchange logic exchanges information between the mobile device and the other device.

20. The mobile device of claim 12, further comprising:
a connector to connect to a server, the server providing data regarding the other device, to enable the pairing of the mobile device and the other device.

* * * * *